Sept. 26, 1950 C. A. DOPP ET AL 2,524,009
BAFFLE CONSTRUCTION
Filed Sept. 13, 1944 3 Sheets-Sheet 1

Inventors:
Carl A. Dopp, &
Eugene C. Petrie.
By: Joseph O. Lange Atty.

Sept. 26, 1950     C. A. DOPP ET AL     2,524,009
BAFFLE CONSTRUCTION
Filed Sept. 13, 1944     3 Sheets-Sheet 2
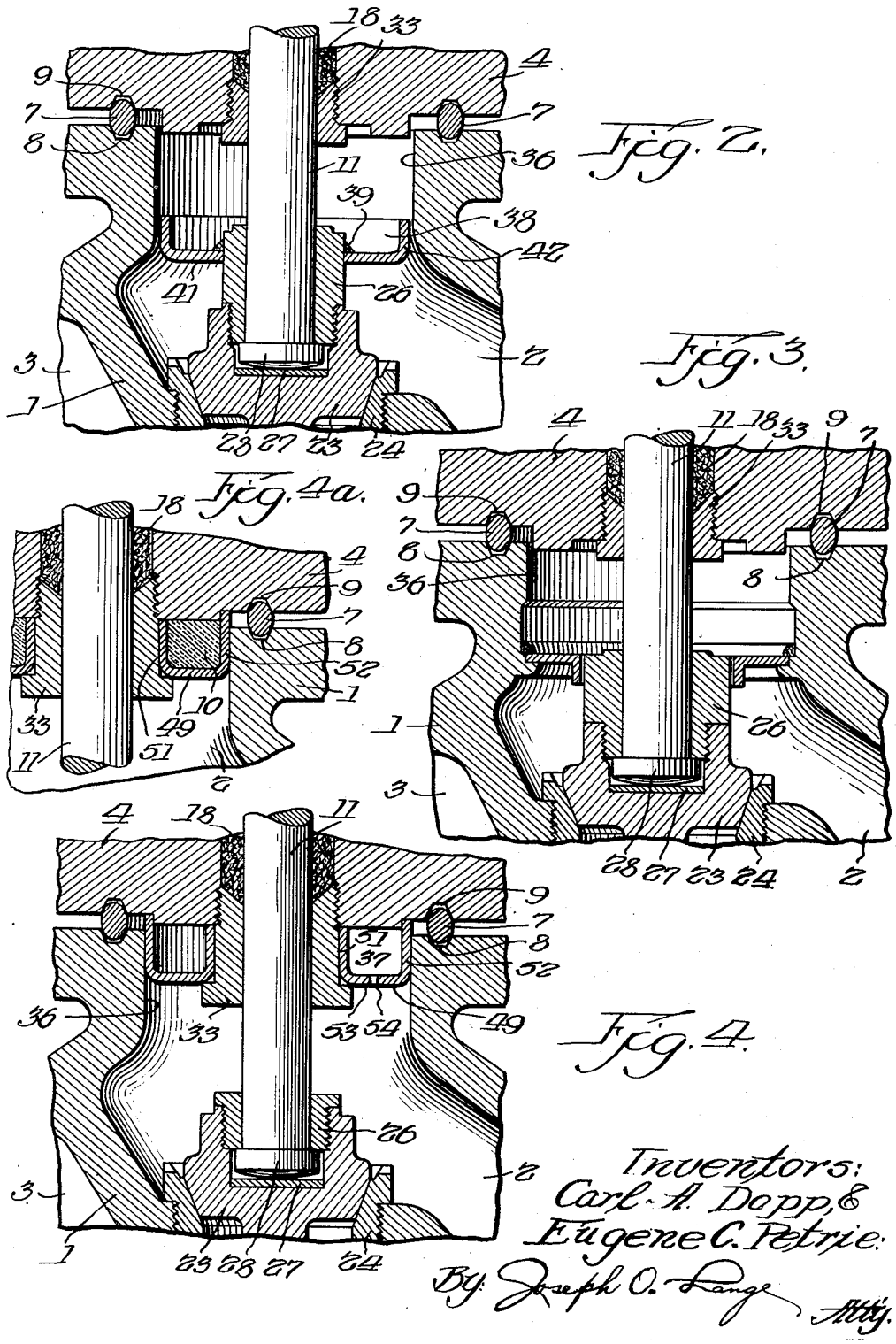
Inventors:
Carl A. Dopp, &
Eugene C. Petrie
By Joseph O. Lange
Atty.

Sept. 26, 1950  C. A. DOPP ET AL  2,524,009
BAFFLE CONSTRUCTION
Filed Sept. 13, 1944  3 Sheets-Sheet 3
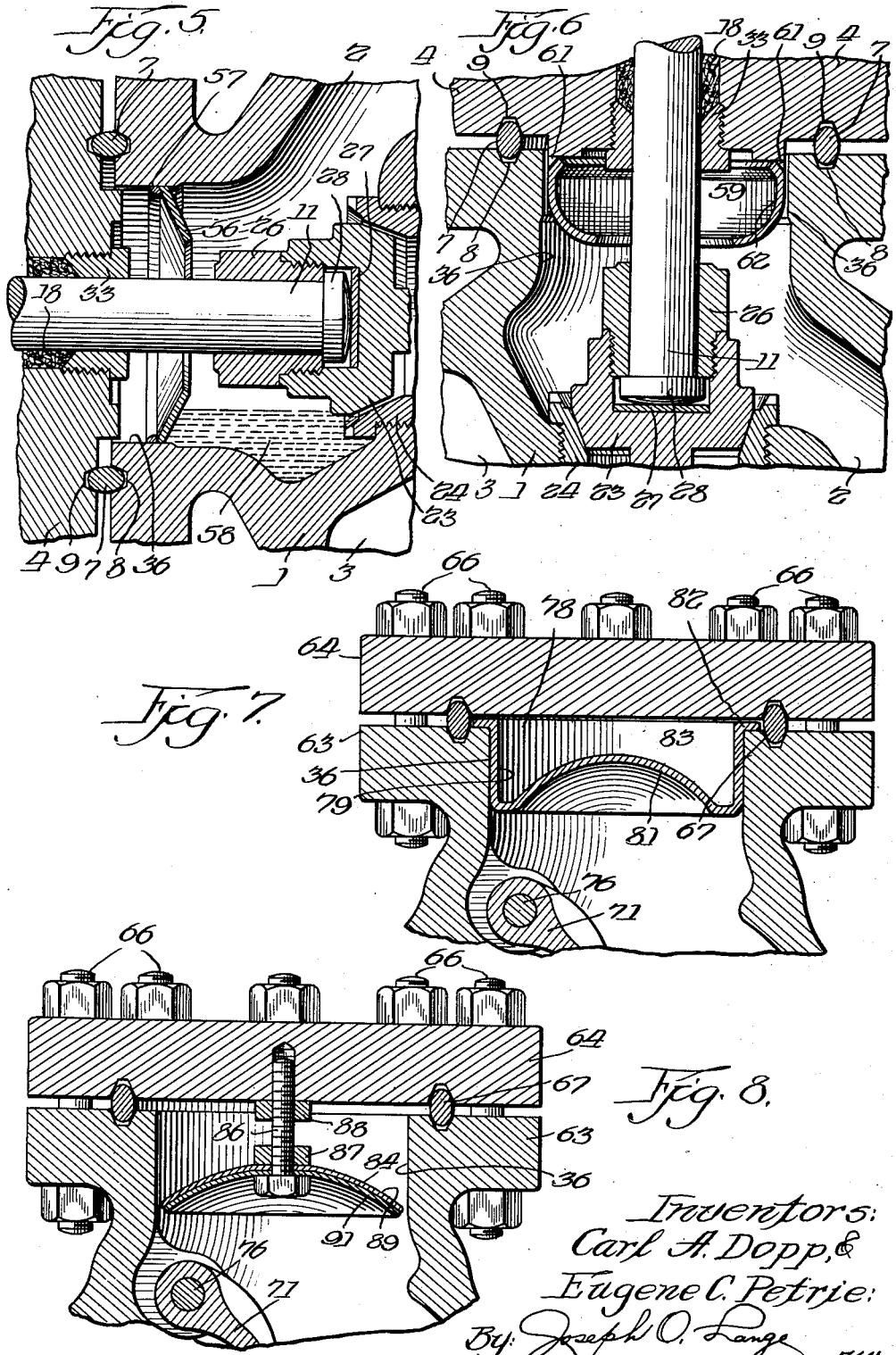
Inventors:
Carl A. Dopp, &
Eugene C. Petrie:
By Joseph O. Lange
Atty.

Patented Sept. 26, 1950

2,524,009

UNITED STATES PATENT OFFICE 2,524,009

BAFFLE CONSTRUCTION

Carl A. Dopp, Park Ridge, and Eugene C. Petrie, Elmhurst, Ill., assignors to Crane Co., Chicago, Ill., a corporation of Illinois Application September 13, 1944, Serial No. 553,949

1 Claim. (Cl. 251—156)

This invention relates broadly to a novel baffle arrangement for use with pressure vessel joints and the like.

To our knowledge no one previously has constructed a joint for a pressure vessel, such as a valve, fitting or the like, which would remain absolutely pressure tight on rapid or sudden temperature changes of the fluid within the vessel, especially when such temperature is suddenly decreased. An example of service where such a condition is regularly encountered is in a power plant using superheated steam, the temperature differential there being produced when meeting additional power requirements by bringing an additional boiler on the line; the oncoming boiler cuts in at substantially saturated steam temperature which is usually several hundred degrees below the normal superheat operating temperature. This connection of the supplemental boiler results in sudden contraction of surfaces in direct contact with the subsequently introduced line fluid. High stress variations are set up within the various component parts and momentary warpage of gaskets and sealing surfaces cause normally abutting sealing surfaces to spread apart momentarily and leak until thermal equilibrium is established at the lower temperature. This leakage, even if slightly occurring each time the pressure system is quenched in the manner described, leads to a serious erosion of the sealing surfaces so that they may ultimately leak even under the most favorable constant temperature conditions. Another example of such quenching service is encountered in certain oil refining processes where valves and fittings may normally be used at 1100 degrees Fahrenheit but at a certain point in the refining cycle it is necessary to instantaneously replace the 1100 degrees fluid by another at 850 degrees.

Another cause for leakage of pressure vessel joints may also be described in connection with a valve installed on a line carrying superheated steam. Where such a valve is in a horizontal position, that is, lying on its side, and liquid condensate is flowing along the bottom with the vapor above it, a temperature differential may exist between the liquid and the vapor. These two fluids flowing into the upper part of the valve body and into the bonnet create corresponding temperature differentials between upper and lower portions of the body-bonnet joint; the localized stresses and warpage of sealing surfaces resulting from this temperature differential causes normally abutting sealing surfaces to be loosened or parted with resulting leakage.

We have discovered that leakage, caused as described above, may be prevented by partitioning of the joint in such a manner that condensate or lower temperature steam or other fluid cannot reach it, or else that leakage due to sudden temperature change of fluid as described may be effectively prevented by providing baffle means which keep the fluid from coming into immediate contact with the joint and the metal adjacent to it upon entering the valve body or fitting.

Accordingly it is a principal object of our invention to provide in combination with a pressure vessel closure, a baffle or similar suitably located means to prevent differential contraction or expansion of the various closure parts which may otherwise result in undesirable fluid leakage.

Another object is to provide in a pressure vessel a baffle in proximity to a joint between such pressure vessel, and a closure therefor, serving to prevent the usual direct impingement or contact of fluid against the joint and the walls immediately adjacent thereto.

Still another object lies in the provision of a baffle in the neck of a valve body below the bonnet joint in order to reduce rapid cooling of the bonnet when the temperature of the fluid within the valve is suddenly lowered; this will prevent the instantaneous contact of the cooler fluid with the body-bonnet joint thereby permitting a gradual uniform cooling of the joint instead of an instantaneous cooling which is conducive to warpage of the sealing surfaces.

Another purpose of our invention is the provision of a thermostatically responsive baffle supported within a pressure vessel proximate to a closure therefor and adapted to expand into contact with the closure vessel on rapid temperature change of fluid within the vessel thereby protecting the seal between the closure and the vessel from the effect of rapid temperature changes.

A further purpose lies in the provision of a partition interposed between a closure member of a pressure vessel and the main body therein.

Another object is to provide a novel baffle connected to the stem of a valve to prevent direct impingement of fluid upon the bonnet or body-bonnet joint.

Another object is to provide a baffle supportable within a pressure vessel opening by the closure member therefor and serving to divert a substantial portion of the fluid in the vessel away from the closure.

Another object lies in the provision of a sheet form of baffle capable of being supported within the bonnet of a valve.

Another object is to provide a flexible baffle means mounted in proximity to a fluid sealing joint in a pressure vessel serving to render the joint tardily respondent to temperature changes within the main body of the vessel.

A still further object lies in the provision of deflecting means in combination with a pressure vessel closure and adapted to prevent contact of the line condensate with portions of the closure.

Other objects and advantages will appear from the following detailed descriptions which are to be considered in connection with the accompanying drawings wherein like parts are designated by like numerals, and in which Fig. 1 is a vertical sectional view of a globe valve embodying one form of our baffle exemplifying the invention.

Fig. 2 is a fragmentary vertical sectional view of a globe valve such as shown in Fig. 1 embodying another form of our invention.

Figs. 3, 4, 4a, 5 and 6 are still further modifications illustrated in the same type of valve.

Figs. 7 and 8 are fragmentary vertical sectional views of swing check valves disclosing other substantial illustrations of our invention.

Figure 1:
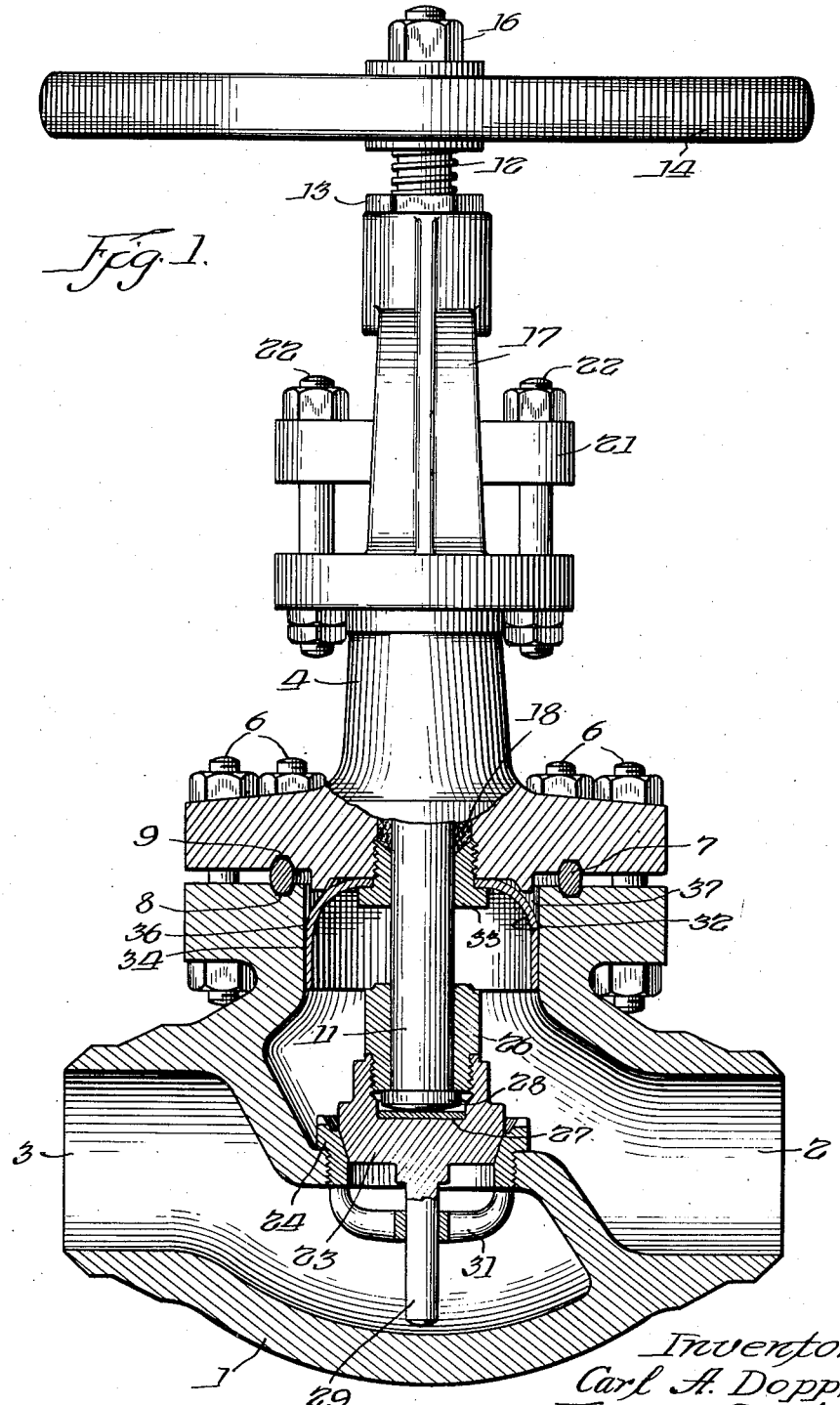

We have chosen a globe valve and a check valve merely for illustrative purposes in connection with the present invention. It will become apparent as the description further proceeds that our invention may of course be readily applied to pressure vessels of all classes without limitation and not merely to valves and fittings.

In Fig. 1 the type of pressure vessel we have shown is known to those skilled in the art as rising stem globe valve having end ports scarfed or beveled for welding and having a ring-joint flanged bonnet connection. The valve comprises the usual parts consisting of a body or casing 1 having ports or passages 2 and 3 which are provided with means for connecting into a piping system, as for instance, with the butt welding ends shown; a bonnet 4 secured to the casing 1 by means of the bolts 6 and the octagonal or oval cross-section gasket ring 7 which fits within the grooves 8 and 9 formed in the casing 1 and bonnet 4 respectively. A stem 11, having formed at its upper end the screw threads 12 which are engaged with like threads formed in the yoke bushing 13, is adapted to move axially upon rotation by means of the handwheel 14 which is suitably connected thereto and held in place by the wheel nut 16. The yoke bushing 13 is fixedly mounted within the yoke 17 which, as shown, is preferably integral with the bonnet 4. Fluid is prevented from leaking out past the stem by means of the usual packing chamber 18, gland (not shown), gland flange 21 and gland bolts 22. The interior of the casing 1 contains the disc 23 cooperating with the screwed-in seat ring 24, the disc stem ring 26 threadedly engaged with the disc 23, the disc washer 27, the lower end of the stem being upset or swaged to form a circumferentially enlarged end portion 28 extending radially outward beneath the disc stem ring 26. In reciprocating to and from the seat ring 24, the disc 23 is guided by a lower axial extension 29 journaled within the lower transverse rib 31 formed across the seat ring 24.

The substance of our invention is illustrated by the inverted cup or bell-shaped baffle 32 which is supported by the flanged bonnet bushing 33. The lower outside wall 34 of the baffle 32 is preferably in contact and parallel to the inside wall 36 in the upper part of the casing 1. The walls 34 and 36 may abut in a fluid sealing manner, as with the equivalent of a machined fit, for example, thus providing a pressure-actuated seal in addition to that provided by the ring gasket 7, or where the cost or other reasons dictate against providing a fine finish on the walls 34 and 36 they may permissibly be sufficiently rough to allow the annular chamber 37 to "breathe" or expand through the space between the baffle 32 and the casing wall 36 upon the occurrence of differential pressures in the chamber 37 and the main interior portion of the valve.

When such a valve as shown in Fig. 1 is installed in a steam power plant line normally carrying superheated steam, the disc or closure member 23 will be in the raised or open position and the valve will be maintained substantially at the superheat temperature of the steam, especially it it is well jacketed with heat insulating material, as is usually the case. As the output demand on the power system increases, from time to time, for one reason or another, additional boilers will be brought onto the line and the steam from them will cut in at substantially saturated temperature or lower, usually several hundred degrees below that of the superheated steam. The valve body will be quenched in the same manner, but of course not to the same degree, as though the inside walls had suddenly been sprayed with cold water. In the conventional valve which lacks such a baffle as we have provided by our invention, the resulting warping or distortion of the gasket ring 7 and the casing and bonnet walls immediately adjacent it causes the gasket seal to be broken and allows a sheet of live steam to spurt from the valve in every direction, endangering workmen and equipment in the vicinity as well as a loss in efficiency. With the baffle 32, however, the gasket and the metal surrounding it is allowed to cool relatively uniformly.

Fig. 2 discloses another modification of our device wherein a cup-shaped baffle 38 is fastened to the disc stem ring 26 by means of weld metal tacking 39. Obviously it could be attached in any other suitable manner as by threading the baffle 38 and the disc stem ring 26 together. The baffle shown has a flat radially extending portion 41 and an axially extending periphery 42. Since this extension 42 is provided merely to assist in guiding the parts within the casing and also to create resistance to flow through the annular chamber between the wall 36 and the peripheral flange 42, it may obviously extend either upwardly as shown, or downwardly, whichever is preferred, and this preference will depend upon the type of valve or service upon which the baffle is to be utilized. In some cases it may be desirable to make the baffle merely in the form of a flat plate taking the shape of a horizontal radially extending portion 41 and thus eliminate the use of the flanged extension 42 altogether; and obviously the same beneficial results will be achieved with the baffle if it is connected directly to the stem 11 instead of to the disc stem ring 26 as shown.

In Fig. 3 another modification is illustrated wherein the annular baffle 43 is shown as attached to the casing wall by means of the welding metal 44, the baffle 43 having a radially extending flat portion 46 and an inner downwardly extending cylindrical portion 47, the disc stem ring 26 being journaled reciprocably therewithin. To install our device as shown, the disc 23 is first dropped into place upon the seat ring 24 and then the baffle 43 is set in place upon the inner positioning shoulder 48 formed in the casing 1, then, by application of the welding bead 44 the outer edge of the baffle portion 46 is joined to the inner wall of the casing 1. The clearance between the disc stem ring 26 and the cylindrical portion 47 of the baffle is preferably small enough to permit only of limited communication between the chamber 37 and the main body of fluid within the valve.

In Fig. 4 another modification is illustrated wherein the hollow annular baffle 49 is provided having the inner cylindrical wall 51, the outer cylindrical wall 52 and the lower connecting wall 53. An elongated flanged bonnet bushing 33 is threaded upwardly into the bonnet 4 and serves to maintain the baffle 49 unitarily with the bonnet assembly. One or more small orifices 54 may be provided to communicate between the chamber 37 and the main body of the fluid, thereby equalizing the pressure. The orifices 54 may be formed in the lower wall 53 as shown or, alternately, in any other wall of the baffle as desired. Of course, the orifices 54 may be omitted to provide an additional seal, if desired, but in such case the walls of the baffle must be constructed very heavily in order to withstand the pressure differential otherwise extant on both sides of the baffle.

Fig. 4a is a modification of the structure shown in Fig. 4, illustrating the application of asbestos or other insulating media for use with the baffle 49.

Fig. 5 is a fragmentary sectional view of a similar globe valve as it would be installed in a vertical pipeline and shows a very simple frusto-conical baffle 56 surrounding the stem and attached to the casing 1 by means of an overlay of welding metal 57. Equally beneficial results would be achieved by the baffle 56 if it were installed in a horizontal pipeline with the valve lying on its side, that is, with the axis of the stem 11 in a horizontal plane. The purpose of the annular wall or baffle 56 is to prevent direct contact of the condensate or other relatively cool line fluid, as indicated at 58, with the gasket ring 7 or any bonnet or body wall immediately adjacent this gasket ring, thus preventing distortion of the sealing surfaces through differential contraction or expansion of the gasket joint which would otherwise result if the upper portion of the ring joint were in contact with superheated vapor and the lower portion were in contact with the relatively cooler liquid at saturated temperature or line condensate.

Fig. 6 is another modification of the construction shown in Fig. 5. A cylindrical walled member 59 having a generally upwardly concave form is attached to the bonnet 4 by means of the welding metal overlay 61, the clearance 62 between the wall 59 and the casing wall 36 being preferably sufficiently small to prevent ready communication of fluid from the main body portion of the valve with the upper portion of the casing surface 36 which is adjacent the ring joint.

In Fig. 7 still another modification is illustrated in connection with a check valve wherein a closed baffle 78 is provided having the cylindrical wall 79 fitted against the casing wall 36, a convex bottom wall 81, the baffle being maintained in position by means of the annular flange 82 which is interposed between the casing 63 and the cap 64. The baffle may be so constructed that the space 83 between the baffle 78 and the cap 64 does not communicate with the main portion of the body, thus providing with the ring-joint a double seal. The baffle 78 may also be provided with an orifice (not shown) to equalize the pressure between the chamber 83 and the rest of the valve in which case the baffle would not necessarily be of such great strength as would be required without an orifice, but still would be effective in preventing rapid differential deformation of the ring joint parts.

In Fig. 8 a modified form shows a downwardly concave baffle 84 which is positioned transversely to the upper casing opening and substantially filling it, the baffle being supported from the cap 64 by means of the bolt stud 86 and the locknuts 87 and 88. The baffle 84 would preferably be constructed of a bimetallic material, the upper metallic portion 89 having a coefficient of expansion greater than the lower metallic portion 91. Thus when the valve is operated at the normal temperature of superheated steam and it is suddenly quenched by the introduction of saturated steam at a temperature several hundred degrees lower, the baffle 84 will flatten and expand radially into forced, substantially sealing contact with the wall 36 of the casing due to the fact that the upper baffle surface 89 contracts at a greater rate than the lower surface 91.

It should be noted that the respective chambers 38 of Fig. 2, 37 of Fig. 4, and 83 of Fig. 7 may be suitably filled with an insulating material, such as asbestos or the like, to further safeguard the joint against the adverse effect of line high temperatures, as for example shown in Fig. 4a, the asbestos being represented at 10.

Whereas we have described our invention in connection with a conventional globe and check valve having a ring type of joint, it will be apparent to those skilled in the art that our invention is readily applicable to any other type of pressure vessel or closure therefor. Accordingly it is our desire to be limited only within the scope of the appended claim.

We claim:

In a joint for a valve or the like, the combination including a casing with an opening therefrom, a closure cooperating therewith to shut said casing opening, a substantially annular gasket positioned between the juncture of the casing and the closure to maintain the latter members in spaced-apart relation, the inner portion of the said gasket being normally exposed to flow of line fluids within the said casing, a dome-shaped baffle removably suspended from the said closure and having a depending skirt portion fitted snugly within the said casing opening between the closure and the casing, removable means for suspending the said baffle centrally from the said closure, the said baffle being provided with an outer curved annular surface portion to shield the inner portion of the said gasket and the juncture of the said casing and closure against said exposure to line flow.

CARL A. DOPP.
EUGENE C. PETRIE.

REFERENCES CITED

The following references are of record in the file of this patent:

UNITED STATES PATENTS

| Number | Name | Date |
|---|---|---|
| 1,357,667 | Williams | Nov. 2, 1920 |
| 1,573,304 | Darling | Feb. 16, 1926 |
| 1,592,363 | Holter | July 13, 1926 |
| 2,074,091 | MacKinnon | Mar. 16, 1937 |
| 2,322,269 | Allen | June 22, 1943 |
| 2,322,269 | Allen | June 22, 1943 |